(12) United States Patent
Roaldsnes

(10) Patent No.: US 8,578,608 B2
(45) Date of Patent: Nov. 12, 2013

(54) MANUFACTURING OF SAND SCREENS

(71) Applicant: Schlumberger Technology Corporation, Sugar Land, TX (US)

(72) Inventor: Kjartan Roaldsnes, Kverneland (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/668,709

(22) Filed: Nov. 5, 2012

(65) Prior Publication Data

US 2013/0185940 A1    Jul. 25, 2013

Related U.S. Application Data

(63) Continuation of application No. 12/106,849, filed on Apr. 21, 2008, now Pat. No. 8,302,310.

(60) Provisional application No. 60/948,210, filed on Jul. 6, 2007.

(51) Int. Cl.
*B23P 15/16* (2006.01)
*E21B 43/08* (2006.01)

(52) U.S. Cl.
USPC .................. 29/896.62; 29/896.61; 166/234; 219/61; 228/173.5

(58) Field of Classification Search
USPC .............. 29/896.61, 896.62; 166/230–234; 140/112; 219/59.1, 61, 60 R, 67; 228/173.5
See application file for complete search history.

(56) References Cited

U.S. PATENT DOCUMENTS

| | | | | |
|---|---|---|---|---|
| 859,836 A | * | 7/1907 | Pfeiffer, Jr. | 166/232 |
| 3,275,785 A | * | 9/1966 | Wilson | 219/56 |
| 3,385,373 A | * | 5/1968 | Brown | 166/232 |
| 3,785,409 A | * | 1/1974 | Smith, III | 140/92.2 |
| 4,066,202 A | * | 1/1978 | Binard | 228/173.5 |
| 4,314,129 A | * | 2/1982 | Wilson et al. | 219/58 |
| 4,771,829 A | * | 9/1988 | Sparlin | 166/233 |
| 5,307,984 A | * | 5/1994 | Nagaoka et al. | 228/189 |
| 5,311,942 A | * | 5/1994 | Nagaoka | 166/232 |
| 5,318,119 A | * | 6/1994 | Lowry et al. | 166/228 |
| 5,355,948 A | * | 10/1994 | Sparlin et al. | 166/228 |

FOREIGN PATENT DOCUMENTS

| | | |
|---|---|---|
| EP | 0527426 A1 | 2/1993 |
| GB | 2269412 A | 2/1994 |
| GB | 2420134 A | 5/2006 |

OTHER PUBLICATIONS

Examination Report to European Patent Application No. 08771157.8 dated Jan. 8, 2013.

* cited by examiner

*Primary Examiner* — Sarang Afzali
(74) *Attorney, Agent, or Firm* — David G. Matthews; Brandon S. Clark

(57) ABSTRACT

A rod-based well screen is formed in place on a perforated pipe base by wrapping wire around the pipe base and a plurality of rods located around the outside of the pipe. The wire is welded sequentially to each individual rod as it is wrapped around the pipe. The welding and ground electrodes engage the wire and the rods respectively. The rod engaging ground electrode is positioned a short distance ahead of the wire being wrapped around the rods and the pipe base. The ground electrode includes a plurality of contacts. Each contact is mounted to pivot toward and away from a rod. Springs urge each contact toward a rod to hold the rod against the outside surface of the pipe base and to maintain good electrical contact between the contact and the rod. Each contact has a groove to guide the rod into position for welding to the wire.

18 Claims, 5 Drawing Sheets

MANUFACTURING OF SAND SCREENS

RELATED APPLICATIONS

This application is a continuation of U.S. Patent Application having Ser. No. 12/106,849, filed on Apr. 21, 2008, and published as U.S. Publication No. 2009/0008085 (now U.S. Pat. No. 8,302,310), which claims priority to U.S. Provisional Patent Application having Ser. No. 60/948,210, filed on Jul. 6, 2007, both of which are incorporated by reference herein.

TECHNICAL FIELD

The present invention relates generally to recovery of hydrocarbons in subterranean formations, and more particularly to tools, systems, and methods for manufacturing of sand screen assemblies.

BACKGROUND

Hydrocarbon fluids such as oil and natural gas are obtained from a subterranean geologic formation, referred to as a reservoir, by drilling a well that penetrates the hydrocarbon-bearing formation. Once a wellbore has been drilled, the well must be completed before hydrocarbons can be produced from the well. A completion involves the design, selection, and installation of equipment and materials in or around the wellbore for conveying, pumping, or controlling the production or injection of fluids. After the well has been completed, production of oil and gas can begin.

Sand or silt flowing into the wellbore from unconsolidated formations can lead to an accumulation of fill within the wellbore, reduced production rates and damage to subsurface production equipment. Migrating sand has the possibility of packing off around the subsurface production equipment, or may enter the production tubing and become carried into the production equipment. Due to its highly abrasive nature, sand contained within production streams can result in the erosion of tubing, flowlines, valves and processing equipment. The problems caused by sand production can significantly increase operational and maintenance expenses and can lead to a total loss of the well.

One means of controlling sand production is the placement of relatively large grain sand (i.e., "gravel") around the exterior of a slotted, perforated, or other type liner or sand screen. The gravel serves as a filter to help assure that formation fines and sand do not migrate with the produced fluids into the wellbore. In a typical gravel pack completion, a sand screen is placed in the wellbore and positioned within the unconsolidated formation that is to be completed for production. The sand screen is typically connected to a tool that includes a production packer and a cross-over, and the tool is in turn connected to a work or production tubing string. The gravel is mixed with a carrier fluid and pumped in slurry form down the tubing and through the crossover, thereby flowing into the annulus between the sand screen and the wellbore. The carrier fluid in the slurry leaks off into the formation and/or through the sand screen. The sand screen is designed to prevent the gravel in the slurry (and other contaminates such as sand and silt) from flowing through it and entering into the production tubing. As a result, the gravel is deposited in the annulus around the sand screen where it forms a gravel pack. It is important to size the gravel for proper containment of the formation sand, and the sand screen must be designed in a manner to prevent the flow of the gravel through the sand screen.

Sand screen types may include wire-wrapped and wire-mesh screen. A wire-wrapped screen generally includes a relatively fine wire wrapped and spot welded to an underlying tubular with interstitial spaces between adjacent wires, whereby the interstitial spaces are sized to prevent particles of a predetermined size from passing through the wire-wrapped screen. Examples of wire wrapping techniques are disclosed in U.S. Pat. No. 3,275,785 and U.S. Pat. No. 4,314,129, which are both incorporated herein by reference. The screen generally circumscribes a length of perforated pipe known as a base pipe. Accordingly, a hydrocarbon fluid (e.g., oil) is permitted to flow through the wire-mesh screen and a percentage of particulate matter is filtered from passing through. The perforations along the side of the base pipe allow the fluid to enter into a production tubing. In other sand screen embodiments, the screen circumscribes a solid base pipe having an inflow control device for regulating the inflow of fluids into the base pipe.

The present invention includes various embodiments of tools, systems, and processes for the manufacturing of such sand screens.

SUMMARY

Embodiments of the present invention include a wire-wrapping assembly for making a sand screen using wire on a base pipe having a plurality of rods extending along an outside surface of the base pipe. The wire-wrapping assembly may include: (1) a pipe support for supporting the base pipe and applying a rotation around the longitudinal axis of the base pipe; (2) a wire feeder adapted to wrap the wire around the outside of the pipe and the rods in spaced helical coils; (3) a first electrode positioned to engage the wire and weld the wire to each rod as the wire is wrapped around the rods; and (4) a second electrode having a mounting ring and a plurality of separate individual contacts with each individual contact engaging only one of the rods, the mounting ring having an inner diameter larger than an outer diameter of the base pipe, each contact being adapted to move radially inward and outward along the mounting ring to engage and disengage with the rods, wherein the first electrode and second electrode define an electrical circuit as the wire engages each rod to weld the wire to the rods. In general, the base pipe includes an obstruction (e.g., termination ring, load ring, nozzle ring, end ring, etc.) protruding radially outward beyond the outer diameter of the base pipe. The inner diameter of the mounting ring is sufficiently large to permit the obstruction to pass therethrough.

In certain embodiments, each contact includes a dovetail-shaped protruding profile formed along a surface, and the mounting ring includes a dovetail-shaped groove formed on a face of the mounting ring for each contact, the mounting ring adapted to receive the profile of the contact within the groove to enable sliding of the contact.

In alternative embodiments, each contact includes a dovetail-shaped groove formed along a surface, and the mounting ring includes a dovetail-shaped protruding profile formed on a face of the mounting ring for each contact, the mounting ring adapted to engage the dovetail-shaped groove of each contact with each protruding profile on the face of the mounting ring to enable sliding of the contact.

In yet another embodiment, each contact is connected to the mounting ring by means of a pinned connection.

In further embodiments, a wheel is arranged proximate the contacts of the second electrode, the wheel adapted to apply a force to one contact at a time when such contact engages one of the rods.

The present invention still further includes a method of making a sand screen on a base pipe having an obstruction protruding radially outward from the base pipe. One embodiment of such method includes the following steps: (1) mounting the base pipe for rotation around its longitudinal axis; (2) positioning a plurality of rods along the outer surface of the base pipe; (3) rotating the base pipe and the rods to wrap a wire in spaced helical coils around the base pipe and the rods; (4) welding the wire to the rods as the wire engages the rods; (5) providing a set of contacts for grounding the rods; (6) grounding each individual rod ahead of the wrapped wire through a separate individual contact that engages only said individual rod on the outside surface of the rod adjacent the wire; and (7) moving (e.g., sliding or rotating) the contacts radially outward to clear the obstruction. Another embodiment of such method includes providing a wheel to apply a force against the back of the contact to facilitate a stronger contact engagement to the rod.

Other or alternative embodiments of the present invention will be apparent from the following description, from the drawings, and from the claims.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention. Moreover, the term "sealing mechanism" includes: packers, bridge plugs, downhole valves, sliding sleeves, baffle-plug combinations, polished bore receptacle (PBR) seals, and all other methods and devices for temporarily blocking the flow of fluids through the wellbore. Furthermore, while the term "coiled tubing" is used throughout, it could actually be replaced by jointed tubing or any relatively small diameter tubing for running downhole.

Generally, various embodiments of the present invention include an improved current path in the welding process in a wire-wrapped sand screen manufacturing operation and a method and apparatus for wrapping wire around a sand screen assembly wherein the tubular assembly is formed of components having different diameters.

Figure 1:
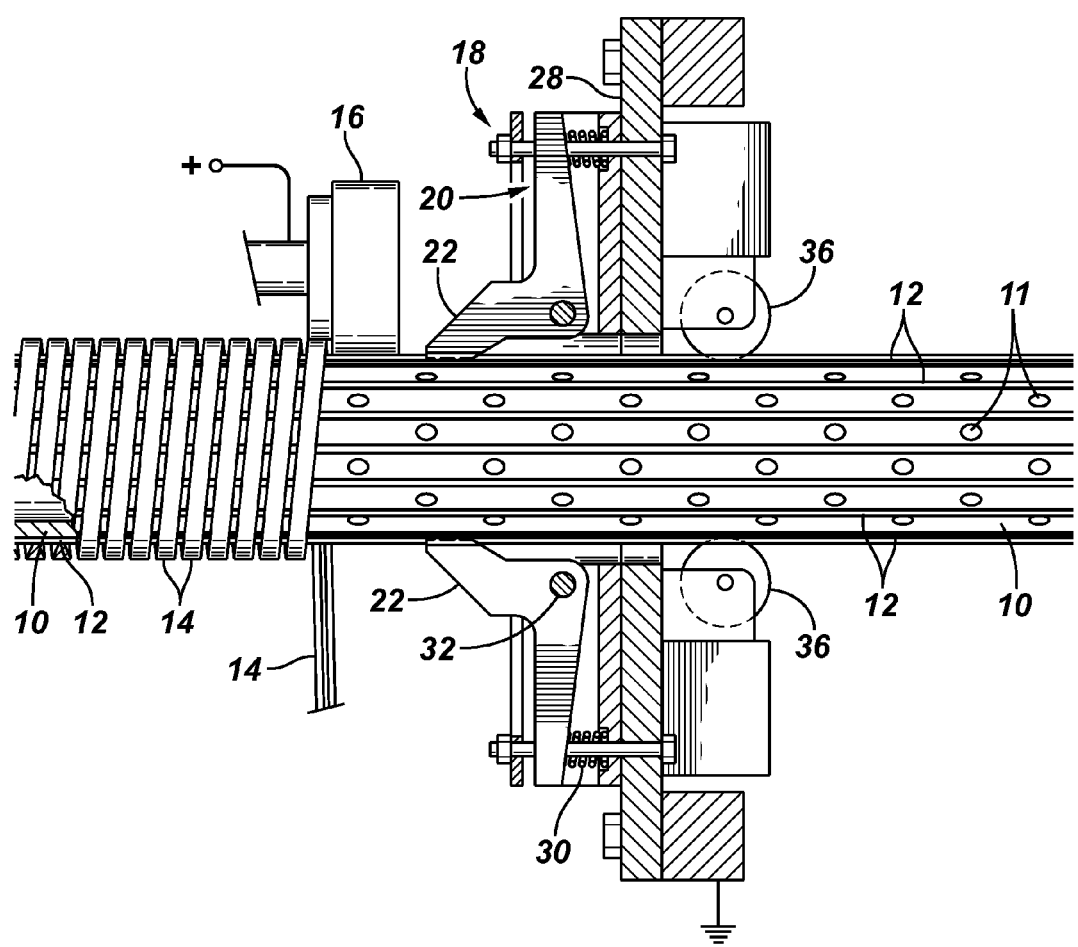
FIG. 1 illustrates a profile view of a prior art mechanism for manufacturing a wire-wrapped screen as shown in U.S. Pat. No. 4,314,129.

Wire-wrapping machines for wrapping and welding wire around a tubular structure (e.g., a perforated base pipe) using pipe handling/rotating support equipment are known in the industry. With reference to FIG. 1, U.S. Pat. No. 4,314,129 describes the known art as follows:

> Pipe base 10 is provided with a plurality of perforations 11. A plurality of rods 12 extend along the outside surface of the pipe base, generally parallel to its longitudinal axis. The rods are usually equally spaced around the outside of the pipe base. Wire 14 is shown being wrapped around the pipe base and rods to form a screen. The wire feeding means is not shown but is of conventional construction usually comprising a drum from which the wire is fed. Usually, some sort of braking arrangement is used to hold the wire in tension to cause it to bend around the pipe and the rods.
>
> To wrap the wire on the pipe and rods, relative rotation between the pipe and rods and the wire feeding means is necessary. Usually, the wire feeding means is fixed and the pipe and rods are rotated. At the same time the pipe and rods are moved longitudinally at a speed which along with the speed of rotation provides the desired spacing between the adjacent coils of wire. Alternatively . . . the wire feeding means can be moved longitudinally of the pipe and rods while the pipe and rods are rotated.
>
> In accordance with this invention first electrode 16 is positioned to engage the wire as it is wrapped on the pipe and provide a welding current that causes the wire and the rod it engages to fuse together. The electrode is disc-shaped and rolls along the wire. To complete the circuit, means are provided to connect the rods to ground a short distance ahead of the wrapped wire.
>
> In the embodiment shown in FIG. 1, such means comprise second or ground electrode 18. The ground electrode includes a plurality of contact assemblies 20. Each assembly includes contact 22 . . . for engaging one of the rods that extends along the surface of the pipe base . . . . Each individual contact assembly is attached to plate 28 . . . along a line extending radially from the center of the pipe base. Each contact engages one of the rods located on the outside of the pipe base.
>
> Electrode 18 including contacts 22 should be made of a material having good electrical conductivity, such as brass. This reduces the tendency for any welding to occur between the contacts and the rods. The rods are generally of steel, often stainless steel. Housing . . . for the rod assembly as well as mounting plate 28 should also be made of a material having good electrical conductivity. The ground electrode assembly is mounted on rotating head . . . for rotation with the pipe and the rods. A commutator or the like (not shown) connects the electrode to ground.

Embodiments of the present invention improve the known art (including, but not limited to, the processes and tools described in U.S. Pat. No. 4,314,129) by providing mechanical means to: (a) adjust the contacts radially outward to overcome obstructions protruding from the base pipe, (b) allow the welding current to have a more optimal path, and (c) other advantages described and/or apparent herein.

Figure 2:
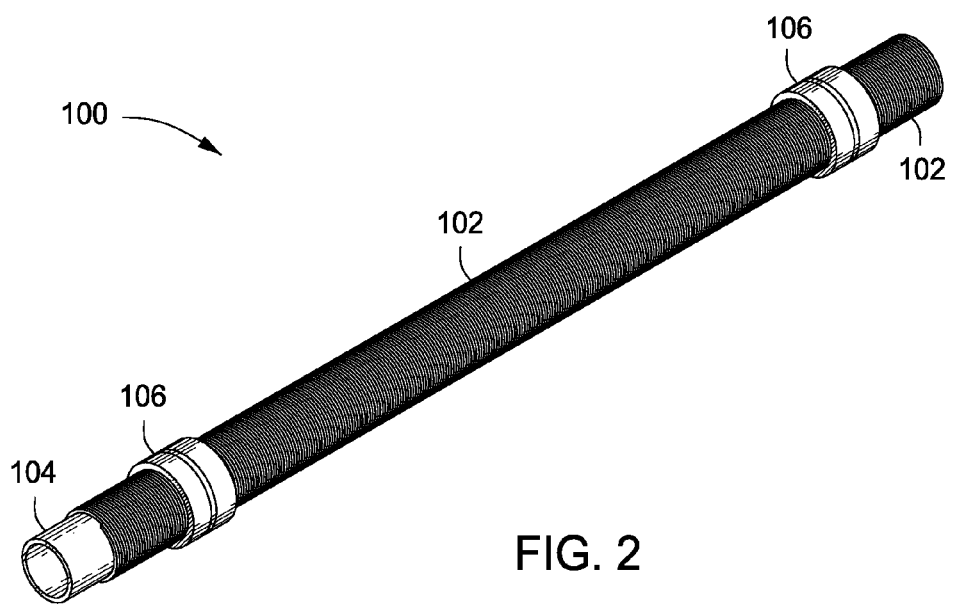
FIG. 2 illustrates a view of a wire-wrapped sand screen assembly having end rings between the wire-wrapped sections.

With regard to FIG. 2, a sand screen assembly 100 is shown having a wire-wrap section 102 formed around a base pipe 104, wherein the wire-wrap section is bounded by radially protruding obstructions 106 (e.g., termination rings, load sleeves or torque sleeves). Other radially protruding obstructions may include nozzle rings (as for inflow control or injection) or shunt tube assemblies or other external hardware.

With respect to FIGS. 3A-3B and 4A-4B, one embodiment of the present invention includes an improved wire-wrapping assembly (e.g., as that described above and as shown in FIG. 1) for wrapping and welding a base pipe 104 with wire 109 across a set of axial rods 108, where the base pipe includes a radially protruding obstruction 106. The improved wire-wrapping assembly includes a mounting ring or plate 200 for holding a plurality of grounding electrode contacts 204. Each contact 204 includes: (a) a dovetail-shaped profile 204A for mating with a corresponding groove 208 in the mounting ring 200, and (b) a contact profile for engaging each axial rod 108. In alternative embodiments, the contact may include the corresponding groove and the mounting ring may include the dovetail-shaped profile.

Figure 3A:
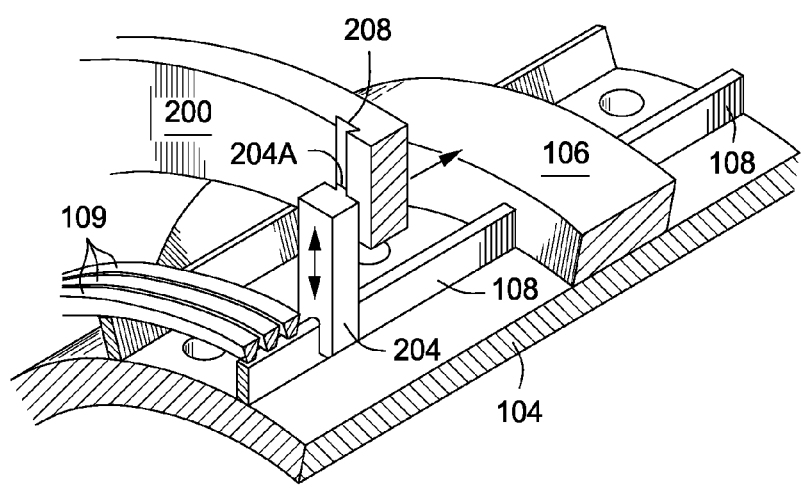
FIGS. 3A-3B illustrate a cut-away view of an embodiment of a wire wrapping assembly in accordance with the present invention for a sliding welding contact.
Figure 3B:
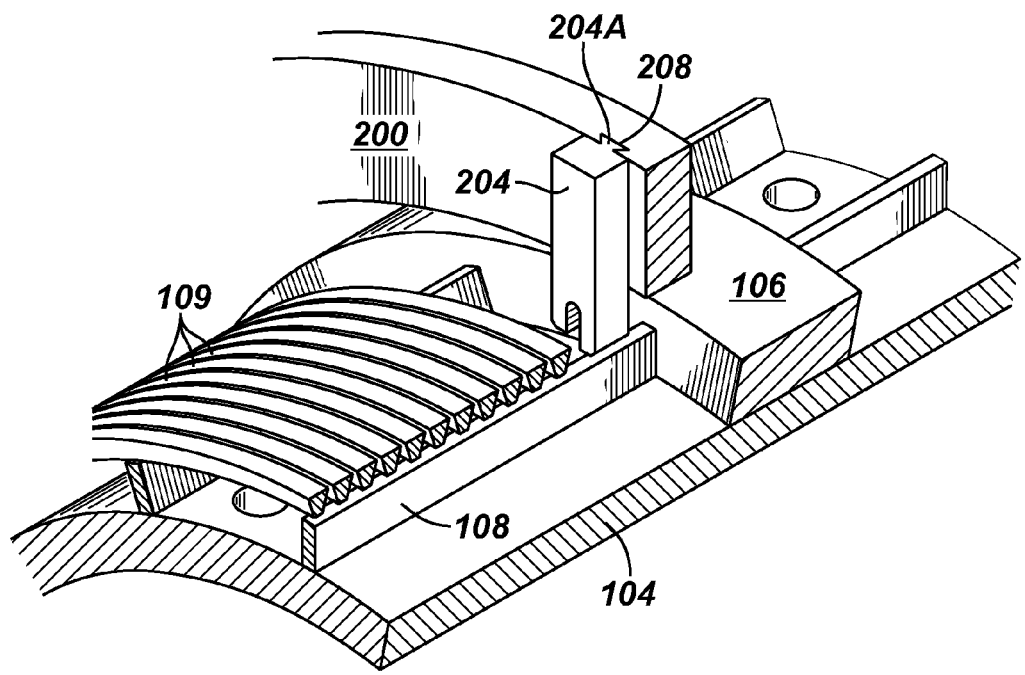
Figure 4A:
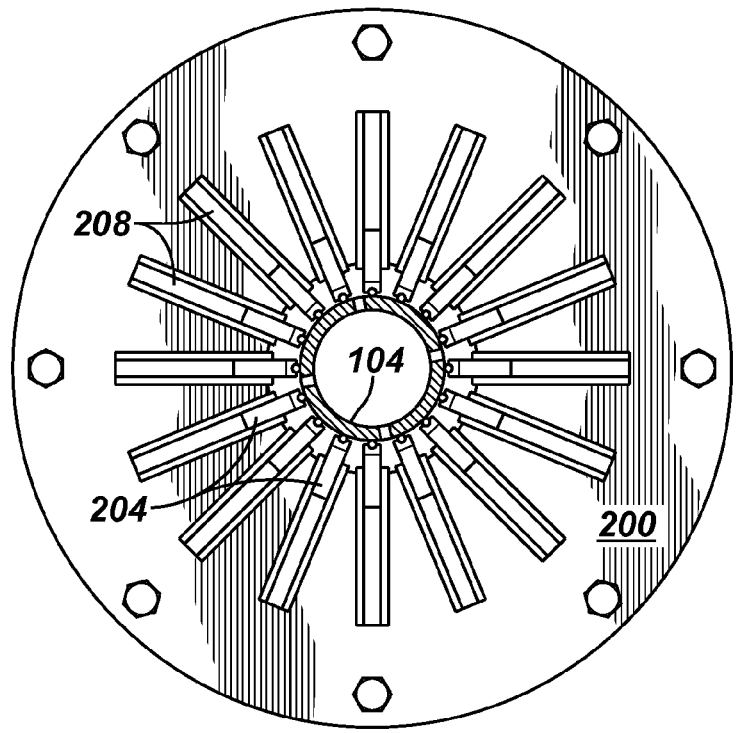
FIGS. 4A-4B illustrate a cross-section view of an embodiment of a wire wrapping assembly in accordance with the present invention for a sliding welding contact.
Figure 4B:
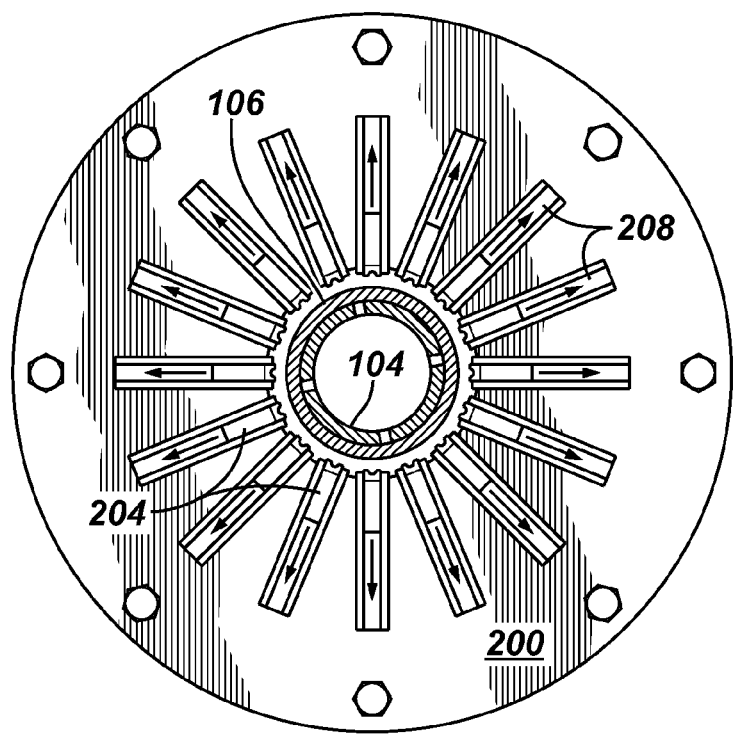

In operation, to wire-wrap the base pipe 104, the contact 204 is in engagement with the axial rod 108 to provide sufficient grounding to weld the wire 109 to the axial rod 108 (as shown in FIGS. 3A and 4A). As the screen section is being wrapped and a protruding obstacle 106 is encountered, the contact 204 is permitted to slide in a linear direction along the groove 208 of the mounting ring 200 radially outward to clear the obstruction 106 (as shown in FIGS. 3B and 4B). When coming to the obstruction 106, the wrapping process is stopped and the wire-wrapping assembly can be moved to a new position on the base pipe 104 even with the obstruction 106 in place. Once clear, the contact 204 can slide radially inward to re-engage the rod 108.

In other embodiments, the wire-wrapping assembly may further include a biasing member (e.g., a spring) connected to each contact for biasing the contact radially inward. The biasing member would permit the contact to slide radially outward to overcome the protruding obstruction, then apply a sufficient force to move the contact back into engagement with the axial rod.

Figure 5:
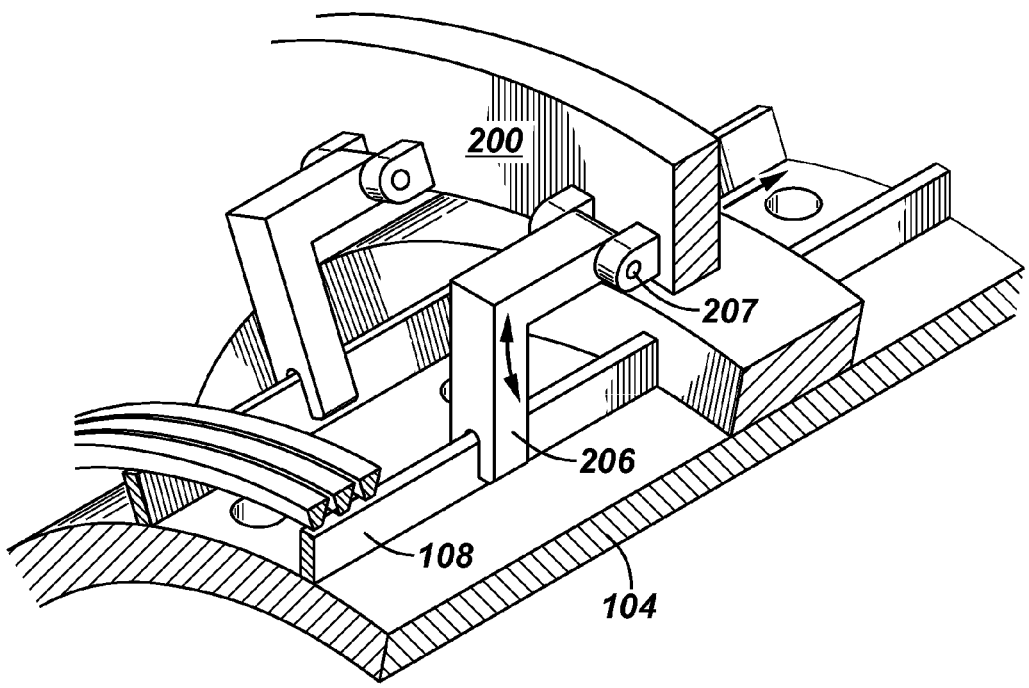
FIG. 5 illustrates a cut-away view of an embodiment of a wire wrapping assembly in accordance with the present invention for a pivoting welding contact.

In an alternative embodiment of the present invention, with respect to FIG. 5, instead of sliding engagement, the grounding electrode contacts 206 are in rotating engagement with the mounting ring 200. Each contact 206 includes a pin 207 for connection to the ring 200 such that the contact is free to rotate as much as ninety (90) degrees to move the contact completely away from the base pipe 104 and to permit clearance of any protruding obstruction. While prior art wire-wrapping machines included contacts with a very limited degree of pivot to account for minor eccentricities or ovality or other imperfections in the underlying base pipe, this embodiment permits a high degree of pivot in the contact as required for the wire-wrapping assembly to clear larger obstructions.

Figure 6:
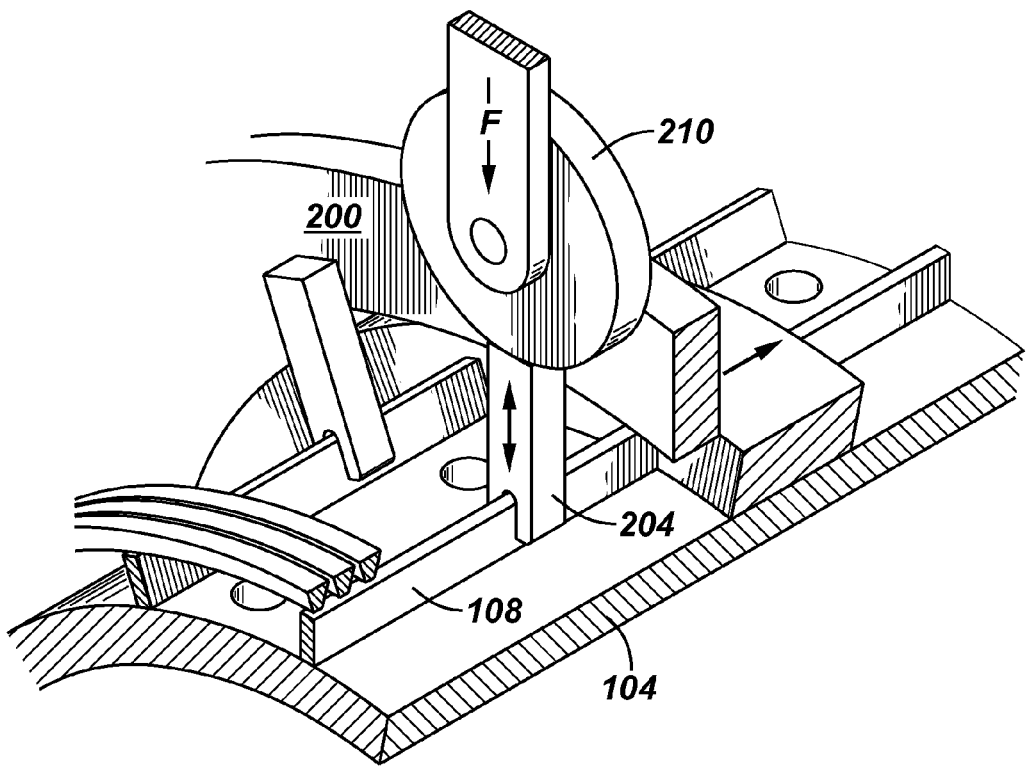
FIG. 6 illustrates a cut-away view of an embodiment of a wire wrapping assembly in accordance with the present invention for providing an improved weld current path.

In still another embodiment of the present invention, with reference to FIG. 6, the grounding electrode contacts 204 engaging the axial rods 204 connected to the base pipe 104 are located on the mounting ring 200 (or plate) as described above. The mounting ring 200 may be adapted to rotate, and the rotation of this ring 200 may be synchronized with the rotation of the base pipe 104. The contacts 204 engaging the axial rods 108 have some degree of freedom to move radially during the wrapping process either to account for minor eccentricities or ovality or other imperfections in the underlying base pipe 104 or even to move substantially outward to account for obstructions 106 along the base pipe 104 such as end rings (all described above). A wheel device 210 is included in the wire-wrapping assembly to align with the contact 204 as it moves into the spot welding position. A force F is applied against the contact 204 by the wheel 210 to more readily secure the contact 204 against axial rod 204. This facilitates formation of a more direct current path than known from existing technology.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for making a screen on a pipe, comprising:
    locating a first wire about a plurality of rods longitudinally disposed on an outer surface of a pipe;
    engaging each rod of the plurality of rods with a corresponding contact member, wherein each contact member is moveable away from a longitudinal axis of the pipe, and wherein each contact member is connected to a mounting ring outwardly disposed from the pipe;
    welding the first wire to the plurality of rods;
    moving the contact members radially outward in a linear direction away from the plurality of rods to form a gap therebetween; and
    moving the mounting ring longitudinally along the pipe such that the contact members traverse an obstruction extending from the outer surface of the pipe, wherein an outer diameter of the obstruction is greater than an outer diameter of the first wire wrapped about the plurality of rods.

2. The method of claim 1, further comprising:
    locating a second wire about a second plurality of rods longitudinally disposed on the outer surface of the pipe, wherein the obstruction is located between the plurality of rods and the second plurality of rods; and
    engaging each rod of the second plurality of rods with the corresponding contact member by moving the contact members toward the second plurality of rods.

3. The method of claim 2, further comprising welding the second wire to the second plurality of rods.

4. The method of claim 1, wherein engaging the plurality of rods with the contact members electrically grounds each rod.

5. The method of claim 1, wherein the gap is maintained between the contact members and the obstruction as the contact members traverse the obstruction.

6. The method of claim 1, wherein each contact member comprises a protrusion, wherein each protrusion is at least partially disposed within a corresponding groove formed in the mounting ring, and wherein each protrusion is adapted to slide in a linear direction within the corresponding groove.

7. The method of claim 1, wherein the mounting ring comprises a plurality of protrusions, wherein each protrusion is at least partially disposed within a groove formed in a corresponding contact member, and wherein each protrusion is adapted to slide in a linear direction within the corresponding groove.

8. The method of claim 1, further comprising a wheel adapted to apply a force to each contact member as the first wire is welded to each rod.

9. The method of claim 1, wherein the mounting ring is a plate.

10. A method for making a screen on a base pipe, comprising:
- wrapping a first wire around a first plurality of rods positioned about an outer surface of a base pipe;
- engaging each rod in the first plurality of rods with a corresponding contact member to provide grounded rods, wherein each contact member is outwardly moveable with respect to the base pipe, and wherein each contact member is connected to a mounting ring disposed about the base pipe;
- welding the first wire to the first plurality of rods;
- moving the contact members radially outward in a linear direction away from the first plurality of rods to provide a gap between the first plurality of rods and the contact members; and
- moving the mounting ring longitudinally along the base pipe such that the contact members move past an obstruction extending from the outer surface of the pipe, wherein an outer diameter of the obstruction is greater than an outer diameter of the wrapped first wire around the first plurality of rods.

11. The method of claim 10, wherein the gap is maintained between the contact members and the obstruction as the contact members move past the obstruction.

12. The method of claim 10, further comprising:
- wrapping a second wire around a second plurality of rods located along the outer surface of the base pipe, wherein the obstruction is located between the first plurality of rods and the second plurality of rods;
- moving the contact members toward the second plurality of rods;
- grounding each rod in the second plurality of rods by engaging each rod in the second plurality of rods with a corresponding contact member; and
- welding the second wire to the second plurality of rods.

13. The method of claim 10, wherein each contact member comprises a protrusion, wherein each protrusion is at least partially disposed within a corresponding groove in the mounting ring, and wherein each protrusion is adapted to slide in a linear direction within the corresponding groove.

14. The method of claim 10, wherein the mounting ring comprises a plurality of protrusions, wherein each protrusion is at least partially disposed within a groove formed in a corresponding contact member, and wherein each protrusion is adapted to slide in a linear direction within the corresponding groove.

15. The method of claim 10, further comprising a wheel adapted to apply a force to the contact members when the first wire is welded to each rod.

16. The method of claim 10, wherein the mounting ring is a plate.

17. A method for making a screen on a base pipe, comprising:
- wrapping a first wire around a plurality of rods positioned about an outer surface of a base pipe;
- engaging each rod of the plurality of rods with a corresponding contact member to provide grounded rods, wherein each contact member is radially moveable with respect to the base pipe, and wherein each contact member is connected to a mounting ring disposed radially outward from the base pipe;
- welding the first wire to the plurality of rods to form a screen thereon;
- moving the contact members radially outward in a linear direction away from the plurality of rods to provide a gap between the plurality of rods and the contact members; and
- moving the mounting ring longitudinally along the base pipe such that the contact members move past an obstruction extending from the outer surface of the base pipe, wherein the obstruction extends a greater distance from the outer surface of the base pipe than the wrapped first wire around the plurality of rods extends from the base pipe.

18. The method of claim 17, wherein each contact member comprises a protrusion that is adapted to slide in a linear direction within a corresponding groove formed in the mounting ring; or
- wherein the mounting ring comprises a plurality of protrusions, and each protrusion is adapted to slide in a linear direction within a groove formed in a corresponding contact member.

* * * * *